US005851325A

United States Patent [19]
Terada et al.

[11] Patent Number: 5,851,325

[45] **Date of Patent: *Dec. 22, 1998**

[54] METHOD OF MANUFACTURING A MOLDED WOODEN PRODUCT

[75] Inventors: Masaki Terada, Toyota; Yoshio Taguchi, Nagoya, both of Japan

[73] Assignee: Toyota Jidosha Kabushiki Kaisha, Toyota, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 557,621

[22] Filed: Nov. 14, 1995

[30] Foreign Application Priority Data

Nov. 17, 1994 [JP] Japan .................................... 6-283605

[51] Int. Cl.$^{6}$ ............................... B32B 5/16; B32B 31/20

[52] U.S. Cl. ......................... 156/62.2; 156/245; 264/112; 264/126; 264/128

[58] Field of Search .................................... 264/109, 112, 264/113, 122, 126, 128; 156/62.2, 242, 245

[56] References Cited

U.S. PATENT DOCUMENTS

| | | | |
|---|---|---|---|
| 3,423,267 | 1/1969 | Munk | 264/112 |
| 4,046,952 | 9/1977 | Shoemaker et al. . | |
| 4,209,433 | 6/1980 | Hse | 264/109 |
| 4,376,745 | 3/1983 | Johns . | |
| 4,378,265 | 3/1983 | Kiss | 156/245 |
| 4,382,108 | 5/1983 | Carroll et al. . | |
| 4,692,292 | 9/1987 | Kollmeier et al. | 264/122 |
| 5,028,374 | 7/1991 | Imao et al. . | |

FOREIGN PATENT DOCUMENTS

| | | |
|---|---|---|
| 25 00 884 | 7/1976 | Germany . |
| 62-90203 | 4/1987 | Japan . |
| A-62-90203 | 4/1987 | Japan . |
| 1-283107 | 11/1989 | Japan . |
| 3-92301 | 4/1991 | Japan . |

*Primary Examiner*—Jan H. Silbaugh
*Assistant Examiner*—Kenneth M. Jones
*Attorney, Agent, or Firm*—Oliff & Berridge PLC

[57] ABSTRACT

This invention relates to a method of manufacturing molded wooden products composed of a wooden body and a skin material. This method employs materials having long working life and enables simultaneous integral molding of the wooden body and the skin. The obtained molded wooden product has excellent characteristics.

17 Claims, 9 Drawing Sheets

METHOD OF MANUFACTURING A MOLDED WOODEN PRODUCT

BACKGROUND OF THE INVENTION

1. Field of the Invention

This invention relates to a method of manufacturing a molded wooden product composed of a wooden body and a skin by compression molding of a collected body of wooden material containing a binder. More specifically, it relates to simultaneous integral molding of a molded wooden product which is used for manufacturing door trim for automobiles and the like.

2. Description of the Prior Art

A molded wooden product of the type to which this invention pertains has a less weight than plywood and is superior in resistance to heat, water and moisture. Moreover, it is strong for its thickness. It is typically known as hardboard and is used for a wide range of applications including the decoration of the interior of automobiles, and the manufacture of furniture and television or stereo cabinets.

This kind of product has hitherto been manufactured by, for example, treating woodchips with steam having a temperature of 160° C. to 180° C. in a steaming tank to loosen them; splitting the loosened chips by means of a splitting machine and the like to produce a wooden fiber; admixing to said wooden fiber a binder such as a synthetic resin, followed by compression molding thereof into a wooden body; and adhering a skin to said wooden body with an adhesive. For manufacturing a wooden body, one method known as the dry mat molding method which includes the steps of forming a mat for molding and compression molding said mat has been carried out. However, this method had problems in that it involves complex procedures, poor workability, high cost of production and the like.

In order to solve the above problems, JP-A 62-90203 disclosed a method of direct compression molding which does not require the step of preparing the mat. The disclosed method comprises stacking a wooden fiber having added binder to form a mass of wooden materials of low density, and delivering said mass of low density into the mold wherein it is compression molded.

As described above, molded wooden products have been manufactured by applying an adhesive onto a wooden body or skin and adhering said skin to said body by means of vacuum molding and the like. The method, however, requires a lot of labor and steps for adhering the skin, thus offsetting the economical merits of employing a new method of manufacturing a wooden body. This led to a study of new methods which comprise delivering the wooden body for molding into the mold to which the skin has been provided previously, and performing simultaneously the formation of the wooden body and the adhesion of the skin.

For example, an R-RIM method has been proposed which comprises injecting urethane to which single glass fibers are admixed while subjecting it to impingement mixing, after mounting the skin into the mold, and then carrying out the molding of the body and adhering with skin at the same time. However, the materials employed in the method are costly, and the strength of the resulting molded product is insufficient.

In addition, the binders used in the above-described manufacturing method of wooden bodies are thermosetting resins such as phenol resins, the hardening process of which requires heating to the high temperatures of 200° to 250° C. Such high temperatures melt and decompose the skin material, since it is made from thermoplastic resins such as PVC and TPO. Therefore, simultaneous integral molding with the above-described wooden bodies was almost impossible.

In order to overcome such problems, JP-A 3-92301 has proposed the method of manufacturing a molded wooden product using polyisocyanate as the binder. This method permits reduction in molding temperature by using a catalyst in hardening of polyisocyanate, so that it is possible to avoid the above problem and permit simultaneous integral molding of the wooden body and the skin.

However, the wooden bodies manufactured using a polyisocyanate as the binder have very low strength as compared to those manufactured with a phenol resin as the binder, and they have a problem of high restitution after compression molding under heat. Use of polyisocyanates also gives rise to the problem of a short of working life due to its high reactivity.

SUMMARY OF THE INVENTION

It is an object of this invention to provide a method of manufacturing molded wooden products which employs materials having long working life, enables simultaneous integral molding of the wooden body and the skin, and provides excellent characteristics.

In order to achieve the objects and in accordance with the purpose of the invention, the method of manufacturing a molded wooden product composed of a wooden body and a skin comprising stacking wooden fibrous mixture in which the binder, selected from an anaerobic adhesive, an unsaturated polyester, or a combination of a phenol and a polyisocyanate, has been added to wooden fibers to form a collected body of the wooden materials, delivering said collected body of wooden material into a compression mold, to which a skin material has been provided previously, and compressing said collected body of wooden material and a skin material to carry out simultaneously the molding of said collected body of wooden material to form a wooden body and the adhesion of said wooden body and the skin.

According to this invention, a simultaneous integral molding of the wooden body and the skin can be performed without melting or deforming the skin material. In addition, according this invention, it is possible to lengthen the usable period of time during which the collected body of wooden material can be used.

DESCRIPTION OF THE PREFERRED EMBODIMENT

Figure 1:
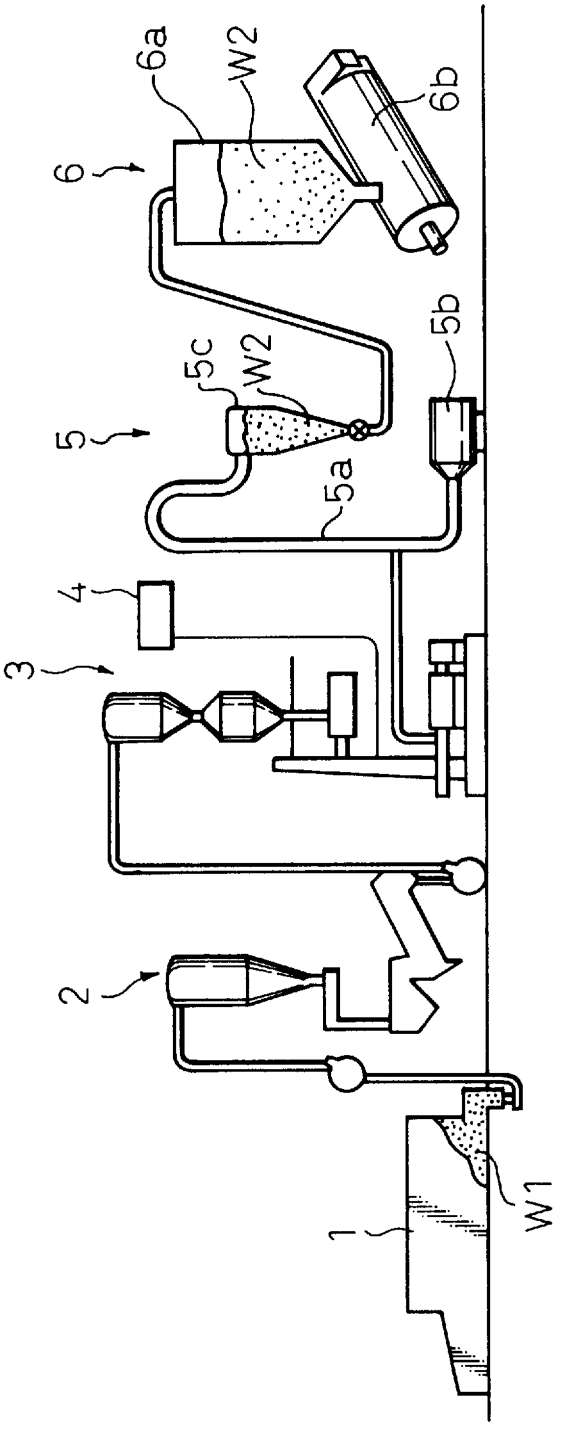
FIG. 1 is a diagrammatic view showing by way of example as apparatus which can be used for preparing a material for molding in accordance with the method of this invention.
Figure 2:
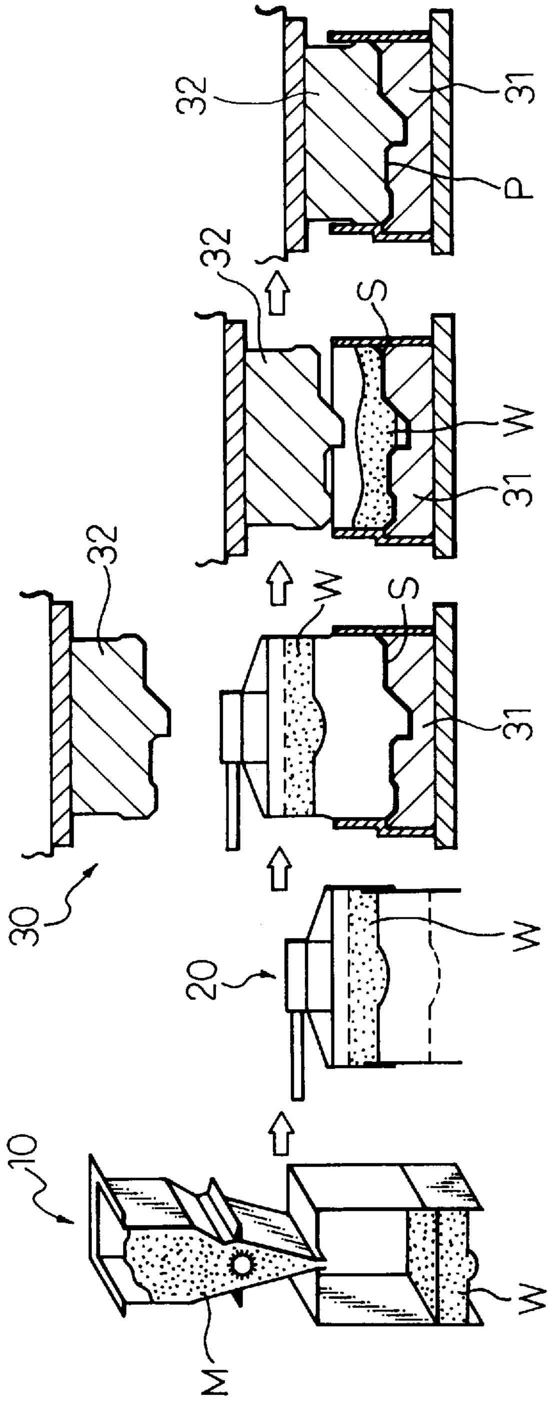
FIG. 2 is a view showing by way of example a molding process which can be employed for manufacturing a molded wooden product in accordance with the method of this invention.

An outline of the method of this invention is described by referring to FIGS. 1 and 2. Wood chips W1 are carried from a storage tank 1 to a chip washing machine 2 in which they are washed. Then, they are carried to a splitting machine 3 in which they are treated with steam and split into fibers while a water-repelling agent is supplied from a pump 4 to the splitting machine 3. The wooden fibers W2 are carried to a drier 5. They are carried on a stream of hot air from a blower 5*b* through a hot air tube 5*a* to a cyclone 5*c*, whereby they are dried. They are then carried to a hopper 6*a* in a mixer 6 and are allowed to drop from the hopper 6*a* into the main body 6*b* of the mixer 6 in which they are mixed with a binder, and other additive, whereby a fibrous mixture M is prepared.

The mixture M is transferred from the mixer 6 to a collecting device 10 and is caused to float down and gather to form collected body W of wooden material having a particular shape. The collected body W of the wooden material is transferred to a holding vessel 20 and conveyed to a mold 30 having a lower mold half 31 in which the collected body W of the wooden material is placed. A skin material was previously provided on the lower mold half 31. An upper mold half 32 is lowered to compress the collected body W of the wooden material, whereby molding of the wooden body and adhesion of the wooden body and the skin material S are carried out and a molded wooden product P is manufactured.

The wooden fibers used in the practice of this invention can be obtained, for example, by splitting wood chips. There is no particular limitation to the wood employed. It is possible to use, for example, Japanese cypress, Japanese red pine, Japanese cedar, lauan, Japanese beech and the like. There is no particular limitation to the wood splitting method, which includes any method known to those skilled in the art. An exemplary method involves heat boiling the wood chips followed by splitting them at ambient pressure, or mechanically splitting the wood chips after boiling.

The binder to be added to the wooden fiber is one selected from an anaerobic adhesive, an unsaturated polyester, or a mixture of a phenol and a polyisocyanate.

When using a mixture of a phenol and a polyisocyanate as the binder, the ratio of the phenol resin and a polyisocyanate is preferably 1:3 to 3:1 by weight, and more preferably 1:1 by weight. The use of the phenol resin alone as the binder requires a molding temperature of higher than 200° C., while the use of a polyisocyanate along cannot yield sufficient strength required for the molded product. The combinated use of a phenol resin and a polyisocyanate permits molding at reduced temperatures at which the skin material does not melt, so that the molded wooden product having more satisfactory strength can be obtained. This effect is further secured by employing the above ratio of the mixture.

The phenol resin may be any one of those which are generally used in the art for adhering wood. Polyisocyanates are also known, and tolylenediisocyanate (TDI), diphenylmethane diisocyanate (MDI), or isocynate prepolymer and the like may be used. The polyisocyanate are so reactive that they form strong primary bonds with, for example, wood, fiber, paper, synthetic resin and the like at relatively reduced temperature. The phenol resin and the polyisocyanate can be added to the wooden fiber, either in combination or alone. Because the undiluted phenol resin or the polyisocyanate is too sticky to be mixed well, the phenol resin may be diluted with water, acetone and the like to facilitate mixing, the polyisocyanate may be diluted with acetone and the like to facilitate mixing.

The phenol resin and the polyisocyanate are added preferably in the range of 6 to 20% by weight of the mixture. When the amount added is lower than the range, sufficient strong bonding may not be obtained, whereas when it is higher than the range, the manufacturing cost will be too high and the molded product obtained may be too rigid, which can cause brittle fracture.

Thus, the wooden mixture into which the wooden fiber and the binder are added is stacked to form the collected body of the wooden material, which then is delivered into the mold into which the skin material has been provided previously, followed by the simultaneous compression molding and adhesion of the above collected body of the wooden material and the skin material. By carrying out the molding at 90° to 130° C., sufficiently strong bonding will be obtained without melting the skin material. A variety of skin materials can be used, including PVC, PVC with PVC foam layer, TPO with PP foam layer, PVC with PP foam layer and the like.

While a mixture of a phenol resin and a polyisocyanate fully hardens at temperature of 90° to 130° C., the curtailment of hardening time may be desirable in some cases. Although higher temperatures can shorten the hardening time, it may result in the problem of deformation of the skin material. In order to overcome the problem, the temperature of one of the mold half with which the skin material comes into contact is reduced, whereas the other one of the mold half with which the collected body of the wooden material comes into contact is elevated. That is, the temperature of the mold half at the side of the skin is maintained in the range of 80° to 110° C., whereas the temperature of the mold half at the side of the collected body of the wooden material is maintained in the range of 100° to 150° C. Because the coefficient of linear expansion of the skin material is greater than that of the collected body of wooden material, molding using the same mold temperature may cause warp of the resulting wooden product when it returned to room temperature due to a larger constriction of the skin material. However, this warp which occurs when the collected body of wooden material returned to room temperature can be minimized by adopting a higher temperature at the side of the collected body of the wooden material.

In order to shorten the hardening time, a catalyst for hardening of polyisocyanate may also be used. A variety of such catalyst are known, including, for example, N,N,N',N'-tetramethylhexamethylenediamine, N,N,N',N'-tetramethylpropylenediamine, N,N,N',N'-tetramethylethylenediamine, N,N,N',N',N'-pentamethyldiethylenetriamine, N,N-dimethylbenzylamine, N-methylmorpholine, N-ethylmorpholine, 1,4-diazobicyclo[2,2,2]octane, 1,8-diazabicyclo[5,4,0]-7-undecene, 1,5-diazabicyclo[4,3,0]non-5-ene, dimethylethanolamine, N-methyl-N-(dimethylaminopropyl)aminoethanol, dimethylaminopropylamine, N,N,N',N'-tetramethyldiethylenetriamine, 2,4,6-tris(dimethylaminomethyl)phenol.

Thus these catalysts may be added at the time of mixing the binder, wherein the hardening of the binder proceeds even at reduced temperatures, leading to the unfavorable result of a short period of time during which the collected body of wooden material can be used. In order to lengthen the time, above catalysts can be used as follows:

In one method, the above catalyst is precoated on the surface of the skin material with which the collected body of the wooden material comes into contact at the time of delivery of the collected body of the wooden material. The catalyst evaporates at the time of compression molding of the molded wooden product and spreads into the interior of the collected body of the wooden material. As a result, the hardening of the binder is promoted, so that the hardening time can be shortened. In another method, the catalyst is admixed with the collected body of wooden material at the time of its molding of the collected body of the wooden material after it was introduced into the mold. The mold for molding is, usually, perforated for degassing. Using these holes in the mold, the catalyst can be spread within the collected body of the wooden material. According to this method, the catalyst can be homogeneously dispersed and the hardening time of the binder can be further shortened. Thus, use of the catalyst enables the curtailment of the hardening time of the binder, and the molding can proceed at lower temperatures than when no catalyst is used.

As described above, polyisocyanates are highly reactive and slowly react with water or phenol even at ambient temperature. Therefore, when the collected body of the wooden material containing the binder is allowed to stand for a prolonged period of time, it becomes useless due to the hardening of the binder. In order to lengthen the time during which the collected body of the wooden material can be used, the delayed addition or addition immediately before the hardening of the binder is desired.

According to one method, the wooden fiber is first mixed with the phenol resin. Since the phenol resin has a low reactivity, it can be stored for a prolonged period of time provided it is stored under desired conditions. Subsequently, and immediately before molding, the mixture of the wooden fiber and the phenol resin may be stacked into the stacking case of a collecting device while spraying a polyisocyanate to the mixture as the mixture is allowed to drop, whereby the collected body of the wooden material is formed. The spraying serves to homogeneously disperse the polyisocyanate into the collected body of the wooden material. Subsequently the collected body of the wooden material is delivered into the mold for molding.

According to second method, the wooden fiber and the phenol resin is mixed and stacked to form the collected body of the wooden material. As described above, the collected body of the wooden material can be stored for a prolonged period of time. Polyisocyanate is then sprayed onto the collected body of the wooden material on the side with which the skin will come into contact while it is being transferred to be delivered into the mold. The collected body of the wooden material has such a low density that the polyisocyanate can penetrate deep into the inside of the collected body of the wooden material. As can be expected, the concentration of the polyisocyanate is higher at the side the polyisocyanate is sprayed, i.e. the side with which the skin comes into contact. Since the adhering strength of the polyisocyanate and the skin material is greater than that of the phenol resin and the skin material, the molded wooden product with a greater bonding strength can be obtained. Although the mold side of the collected body of the wooden material is richer in the phenol resin and poorer in the isocyanate, the elongation of the hardening time can be prevented by elevating the temperature of the mold.

According to a third method, the wooden fiber and the phenol resin is mixed as described above, whereafter a polyisocyanate is sprayed onto the mixture of the wooden fiber and the phenol resin thus obtained while the mixture is allowed to fall, and is stacked into the stacking case of collecting device. Thereupon the polyisocyanate is sprayed to a portion and not the entire collected body of the wooden material required for manufacturing the molded product, so that the upper part of the above stack does not contain the polyisocyanate. The collected body of the wooden material is then weighed, and the amount that is not necessary for manufacturing the collected body of the wooden material is discarded. The discarded portion of the collected body of the wooden material contains little or no, polyisocyanate, so that it can be stored for a prolonged period of time and can be recycled. Subsequently, the polyisocyanate is sprayed onto the collected body of the wooden material, and the collected body of the wooden material is delivered into the mold.

The object of the invention can also be attained by using an anaerobic adhesive as the binder. The anaerobic adhesive remains as liquid while it is in contact with oxygen, but when contact with oxygen is blocked, it starts to polymerize to become a polymeric compound having a strong three-dimensional structure. In the air, the wooden fiber and the anaerobic adhesive are mixed to form the collect body of the wooden material. The collected body of the wooden material can be stored for a prolonged period of time since the anaerobic adhesive does not harden in the air. For molding, the collected body of the wooden material is delivered to the mold which is preset with a skin material, and subsequent compression molding serves to eliminate a large portion of the air within the collected body of the wooden material. Degassing causes the anaerobic adhesive to harden, thus enabling integral molding. A non-limiting example of known anaerobic adhesive is the reactive acrylic adhesive. Molding can be performed even at ordinary temperature, but heating the collected body of the wooden material to, for example, approximately 130° C. will promote the hardening. At this temperature, 130° C., the skin will not change its shape. Further the molded product manufactured by using the anaerobic adhesive as the binder has a sufficient strength.

The object of the present invention may also be attained by using an unsaturated polyester resin in powder form as a binder. Since unsaturated polyester in powder form hardens at a temperature between 80° to 130° C., such a high temperature as is needed when using the phenol resin is not required. It can be hardened even at 50° to 80° C. when the catalyst is used. In addition, the molded wooden product thus obtained has a sufficient strength.

The following examples are submitted to illustrate but not to limit this invention. Unless otherwise indicated, all parts and percentages in the specification and claims are based on weight.

EXAMPLE 1

A phenol resin (Gunei Kagaku K.K., PL4630 (trade mark)) was diluted with water to make a 50% aqueous solution, to which was mixed a wooden fiber in solid form in a ratio of 5% by weight followed by agitation by air. MDI (Nihon Polyurethane, MR-100 (trade mark)) was diluted with acetone to 50% by weight solution. To this solution was added the above mixture of a phenol resin and a wooden fiber in 5% by weight. The mixture thus obtained was stirred to prepare a fibrous mixture M, wherein the ratio of the phenol resin and MDI was 1:1, and MDI was present in the mixture at 10% by weight.

Figure 3:
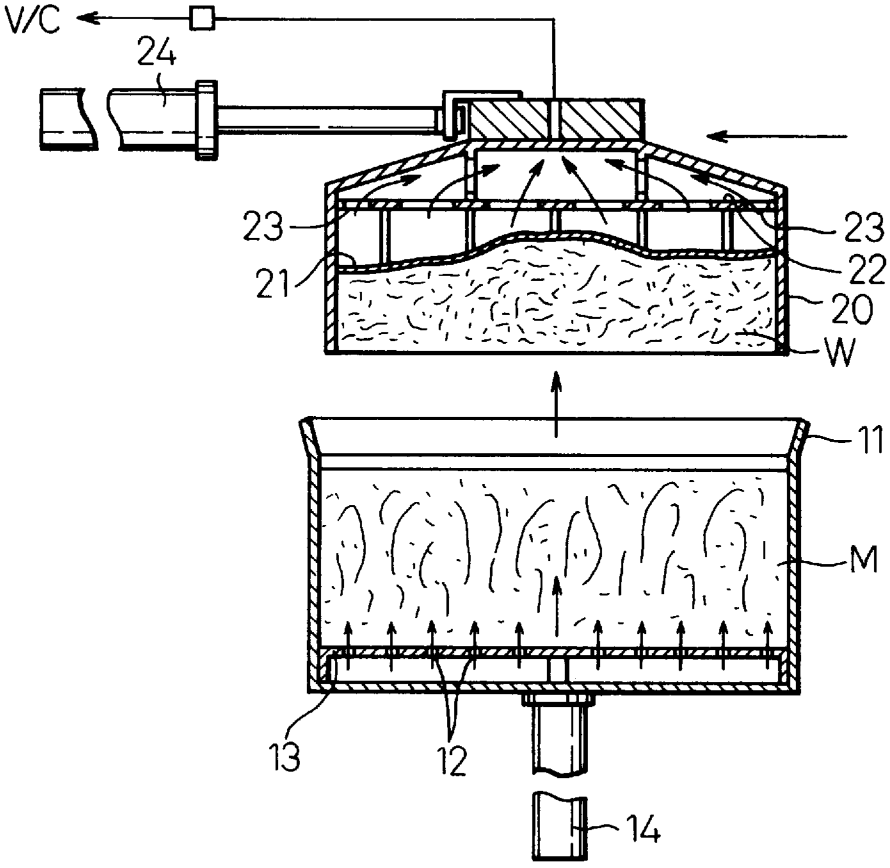
FIG. 3 is a vertical sectional view of the device for forming a collected body of wooden material.

The fibrous mixture M was then transferred to a stacking case 11 of the collecting device 10. As shown in FIG. 3, the fibrous mixture M was stirred by the air supplied from a compressor outside of the case 11 through a plurality of air hole 12 in the perforated bottom plate 13 to make the fibrous mixture M homogeneous.

Figure 4:
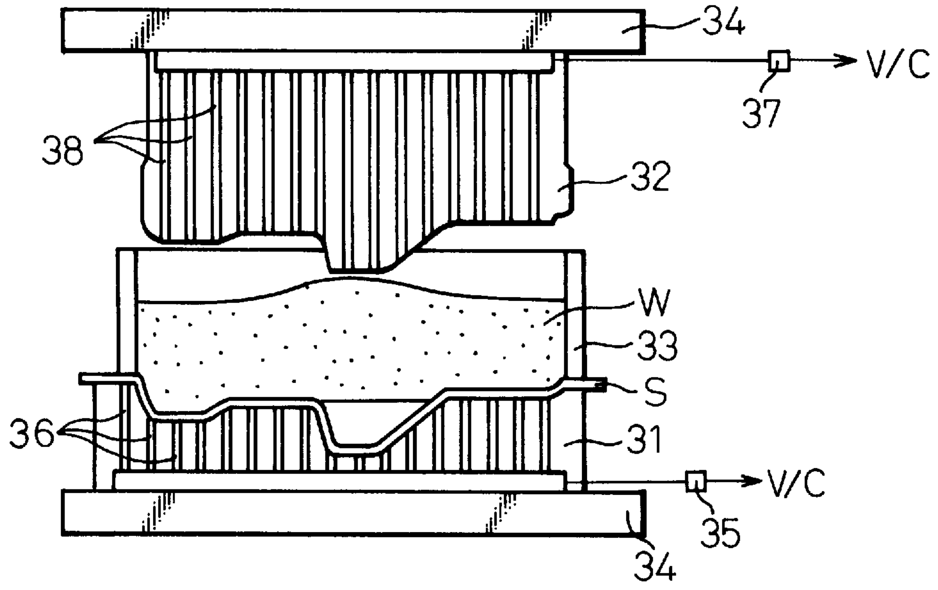
FIGS. 4 and 5 are vertical sectional views showing a mold.

Then, the bottom plate 13 of the case 11 in which the fibrous mixture M was floating was lifted by actuation of a cylinder 14, while performing vacuum cleaning (V/C) from a holding vessel 20 provided above the case 11 to form the collected body W of wooden material. A molding member 21 for extrusion composed of metal net or punching metal and the like hung from a ceiling plate 22 having a vent hole 23 was attached in a shape that suits the shape of a finished molded product of above fibrous mixture M, for example, in a curved form, so that the collected body W of wooden material after vacuum drawing had a shape that corresponds to that of the molded product and a fixed density. The collected body W of wooden material thus obtained was transferred to the molding device shown in FIG. 4 by moving the holding vessel 20 using a cylinder 24.

The molding device comprises an upper mold half 32, a lower mold half 31, a holding frame 33 encircling the lower mold half 31, and a hot plate 34 for physically supporting and maintaining the desired temperatures of the upper mold half 32 and the lower mold half 31. Onto the lower mold half 31 was placed a skin material S which was formed by vacuum molding a skin material having a 0.45 mm thick PVC sheet and a 1.5 mm thick PVC foam layer by opening the electromagnetic valve 35 through the vent holes 36. By releasing the vacuum drawing of the holding vessel 20 for transfer, the collected body W of wooden material falls, due to its own weight, onto the skin material S. Thereafter, the upper mold half 32 was lowered, whereupon molding was conducted at the mold temperature of 100° C., a compressing time of 30 seconds, and a molding pressure of 30 kgf/cm$^2$ to obtain sample 1 of a molded wooden product. Further the collected body W of wooden material was formed using 8% by weight of the phenol resin as the binder, which then was compression molded at 200° C., followed by its adhesion using a urethane adhesive to obtain a comparative sample 1. In addition, a comparative sample 2 was obtained using 23% by weight of the polyisocyanate as a binder in the same manner as above. A comparative sample 3 was obtained employing the R-RIM method described above. On each of these, the adhesion strength and the bending strength of the skin and the body were measured, results of which are shown in Table 1 and 2. Hereupon, the adhesion strength was measured in the peeling test wherein the skin is peeled halfway from the body and the weight required for the peeling is determined. The bending strength was measured as the three-point bending strength.

TABLE 1

| | Adhesion Strength |
|---|---|
| Sample 1 | 2.6 kgf/25 mm |
| Comparative Sample 1 | 2.0 kgf/25 mm |

TABLE 2

| | Bending Strength |
|---|---|
| Sample 1 | 250 kgf/25 mm |
| Comparative Sample 1 | 380 kfg/25 mm |
| Comparative Sample 2 | 180 kgf/25 mm |
| Comparative Sample 3 | 170 kgf/25 mm |

As shown in Table 1 and 2, by using the mixture of a phenol resin and a polyisocyanate as the binder, the hardening temperature can be reduced so that the integral molding of the skin and the wooden body can be conducted at lower temperatures than when phenol alone is used, and molded wooden products having a higher strength than those obtained using a polyisocyanate alone can be obtained.

EXAMPLE 2

In a manner as described in Example 1, the collected body W of wooden material was formed, and this was placed in the molding device. Molding was conducted at the molding pressure of 30 kg/cm$^2$, and a compression time of 30 seconds as in Example 1, employing different temperatures at the upper mold half 32 (the side of the collected body W of wooden material) and the lower mold half (the side of the skin material S) at the time of molding as shown in Table 3. The outer appearance of the skin, irreversible deformation of the foam layer, and the warp of the obtained molded wooden products (500 mm×500 mm) were determined, and results are shown in Table 3.

TABLE 3

| | | | |
|---|---|---|---|
| Temp. of Upper Mold Half | 110° C. | 140° C. | 140° C. |
| Temp. of Lower Mold Half | 110° C. | 90° C. | 140° C. |
| Quality of Skin Appearance | good | good | NG |
| Irreversible Deformation in the Foam | <0.1 mm | 0.1–0.15 mm | 0.1–0.2 mm |
| Warp | 3–5 mm | 1–3 mm | 2–4 mm |

As shown in Table 3, by using different temperatures at the side of the skin and at the side of collected body of the wooden material, with the temperature at the side of the skin being lower, the change of the shape of the skin was reduced. On the other hand, higher temperatures are employed at the side of the wooden body in order to shorten the hardening time of the skin, thus enabling the reduction in the cycle time.

EXAMPLE 3

N,N,N',N'-tetramethylethylenediamine catalyst (Kao K.K., Kaolyzer No. 11 (trade mark)) was sprayed onto the skin material S at the side at which the collected body W of the wooden material comes into contact at a concentration of 0.5 g/m$^2$, whereafter this skin material S was placed in the lower mold half which was kept at a temperature of 100° C. The collected body W of the wooden material was formed in a manner of Example 1, and placed in the molded device. Then molding was carried out at a temperature of the upper mold half of 125° C., a temperature of lower mold half of 110° C., the compression time of 20 seconds, and the molding pressure of 30 kgf/cm$^2$. The bending strength of the resulting molded product was 250 kgf/cm$^2$, which was almost equal to Sample 1 in Example 1 despite the short compression time of 20 seconds.

By applying a catalyst for binder hardening the body on the side of the skin prior to molding, said catalyst can be evaporated and diffused into the body during the molding, resulting in the reduction of the hardening time. In addition, due to the pressure of a greater amount of the catalyst in the adhesion surface between the skin and the wooden body, the hardening at this portion is faster than other portions, so that the bonding between the skin and the wooden body is ensured.

EXAMPLE 4

Figure 5:
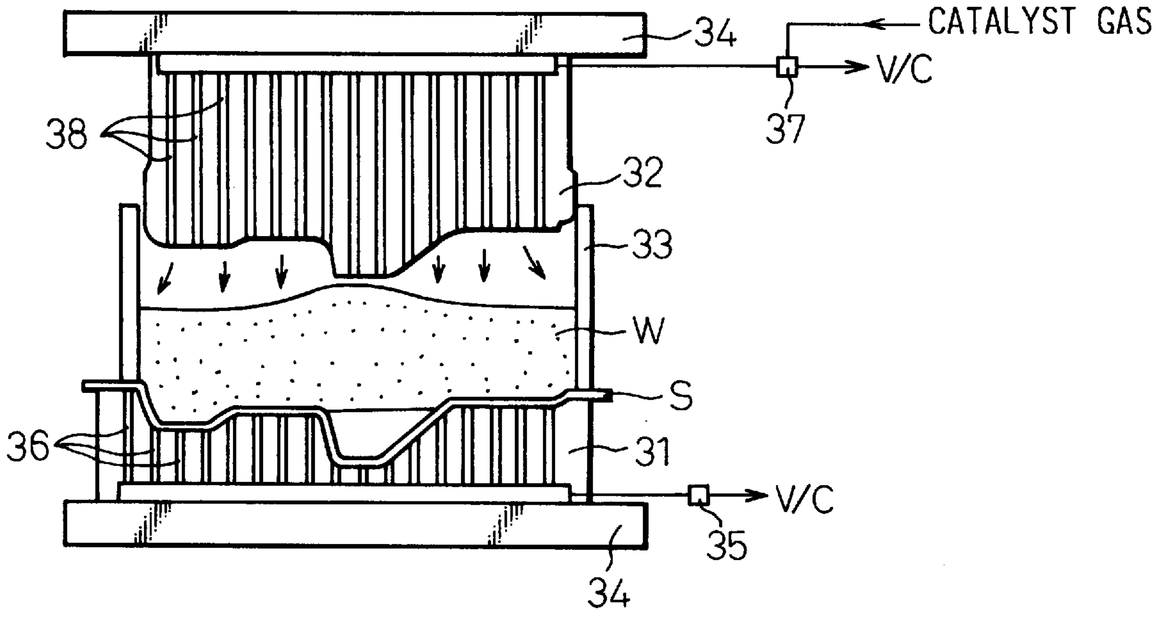

As described in Example 1, the collected body W of the wooden material was formed. As shown in FIG. 5, this was then placed onto the skin material S in the mold device, whereafter the upper mold half 32 was allowed to descend so that the holding frame 33 and the upper mold half 32 come into contact with each other to form a closed chamber. Immediately after this, the electromagnetic valve 37 was switched to cause the catalyst gas to flow through the vent hole 38. The catalyst gas was allowed to flow for up to half of the total compression time at the most, whereafter the electromagnetic valve 37 was switched to the side of the V/C pump through the vent hole 38. Thereafter, the upper mold half was allowed to descend to obtain a sample of the molded product.

In this example, the catalyst can be homogeneously dispersed into the collected body W of wooden material, so that a reduction in the hardening time is attained.

EXAMPLE 5

Figure 6:
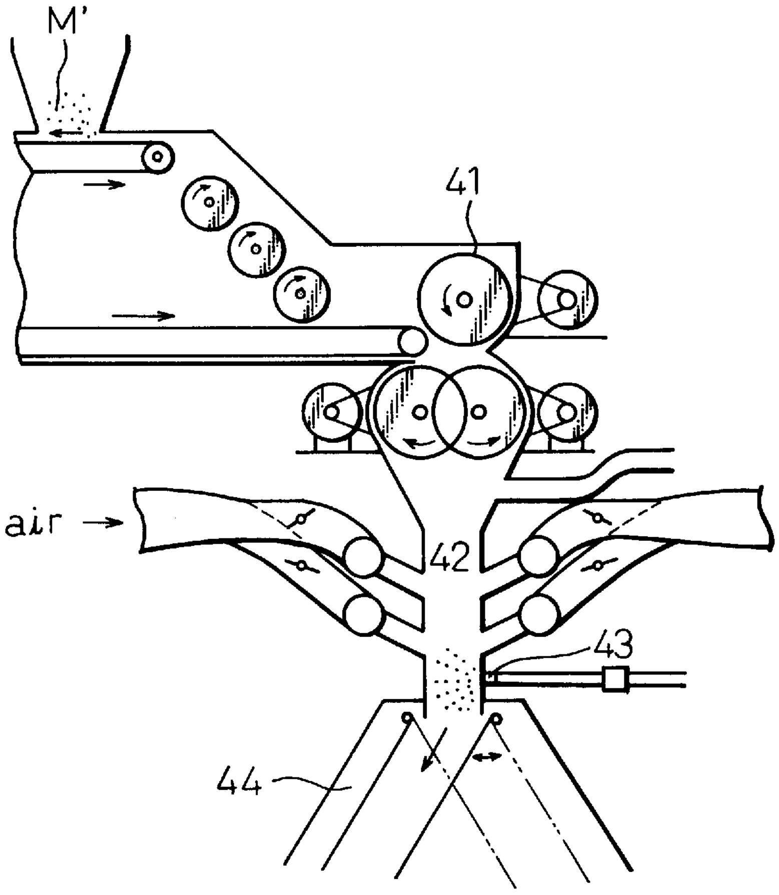
FIG. 6 is a vertical sectional view of the device for spraying a polyisocyanate onto the fibrous mixture containing a phenol resin.

A phenol resin (Gunei Kagaku K.K., PL4630 (trade mark)) was distilled with water to prepare a 50% aqueous solution. This solution was mixed with 5% by weight of wooden material in the solid form and stirred, by air, to homogeneity to obtain the fibrous mixture M'. Using an apparatus such as shown in FIG. 6, this fibrous mixture M' was allowed to pass through a fluffer roller 41 and to fall vertically. At the bottom end of the vertical falling path 42, a 50% solution of MDI (Nihon Polyurethane K.K., MR-100 (trade mark)) in acetone was sprayed through a nozzle 43 to form the fibrous mixture M. The fibrous mixture M thus formed was allowed to spread and fall, whereby it is supplied to the stacking case 11 of the collecting device 10 shown in FIG. 3. After formation of the collected body W of the wooden material, a sample of the molded wooden product was obtained in a manner as described in the above Example 1.

In this example, the addition of the polyisocyanate which reacts with water or phenol resin even at room temperature is delayed by adding it immediately before the forming of the collected body W of the wooden material, so that the curtailment of the period during which the body is usable can be prevented.

EXAMPLE 6

Figure 7:
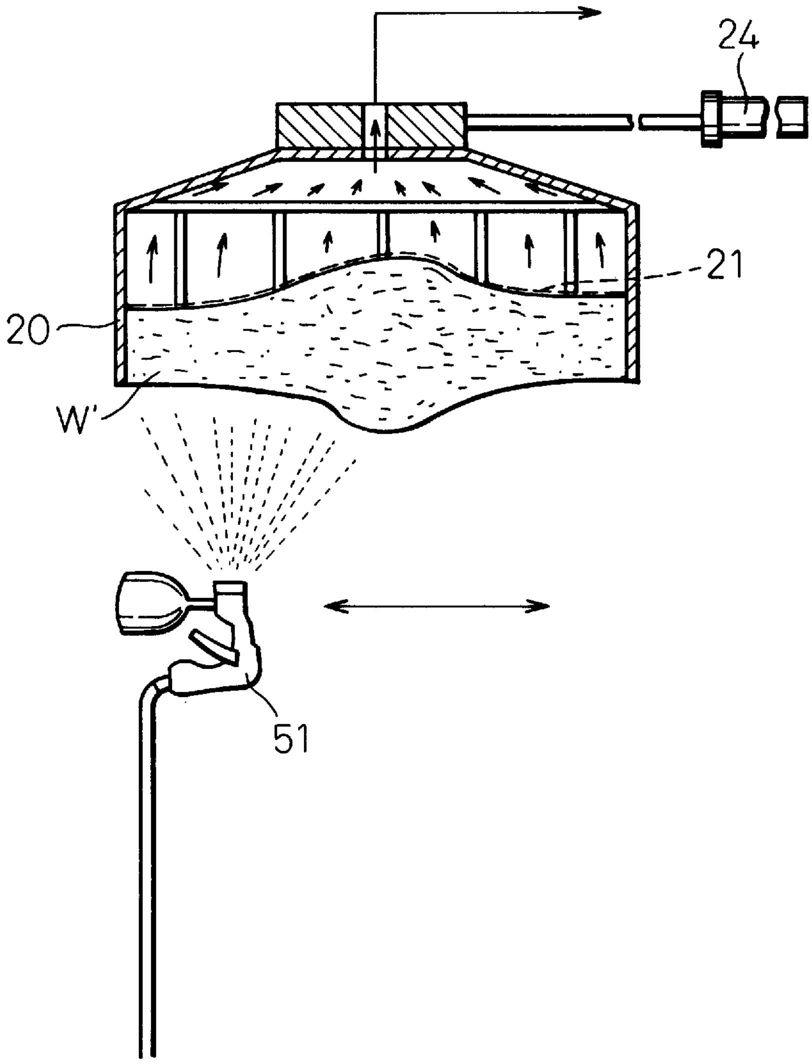
FIG. 7 shows different ways of adding a polyisocyanate onto the fibrous mixture containing a phenol resin.
Figure 8:
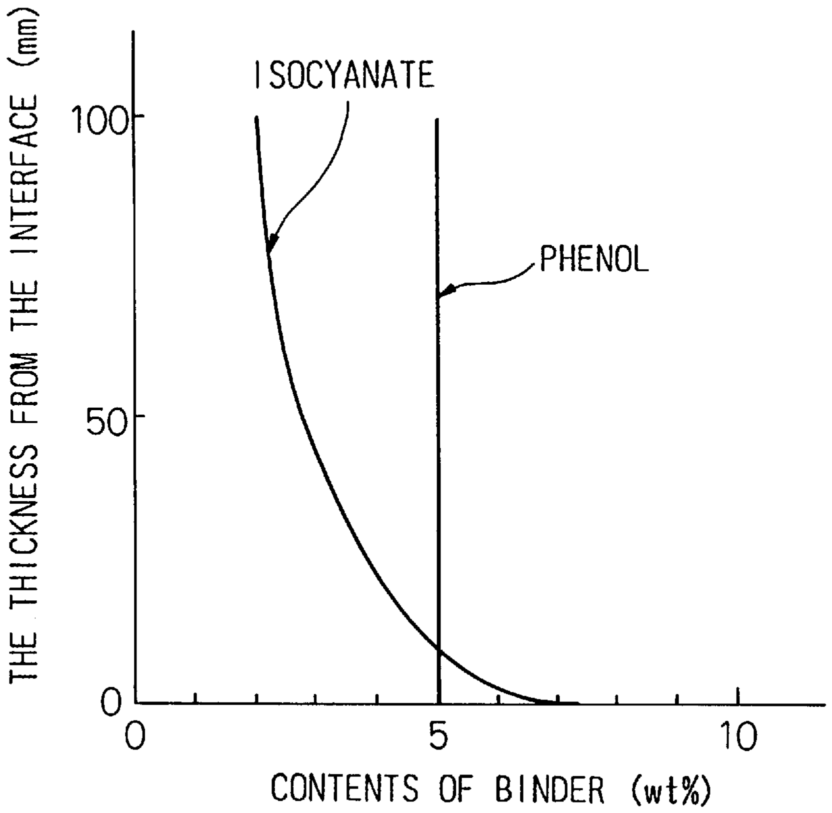
FIG. 8 is a graph showing the distribution of the binder within the molded wooden product obtained in Example 6.

Using the same method as described in Example 5, the fibrous mixture M' containing only the phenol resin, was formed and, fed into the stacking case 11, whereby the collected body W' of wooden material was formed. When this collected body W' of wooden material was being carried in the holding vessel 20, the polyisocyanate was sprayed from below as shown in FIG. 7 using the air gun 51 (Iwata Tosouki K.K., W88-10E2P) with air pressure of 3.5 kg/cm$^2$. Then this collected body W' was placed into the molding device, wherein a sample of the molded wooden product was obtained using the same method as described in Example 1. The content of the binder in the molded wooden product sample obtained was measured along the direction of the thickness of the molded wooden product to determine its distribution. As a result, as shown in FIG. 8, the phenol resin was distributed evenly since this was originally contained in the sample, whereas more polyisocyanate was present at the lower portion. With this method, the distribution of the polyisocyanate can be changed, so that more polyisocyanate can be distributed near the interface with the skin material S where a stronger adhesion is required. By mixing the polyisocyanate immediately before delivering into the mold, the collected body of the wooden material can be stored for a prolonged period of time, and the period during which the collected body of the wooden material is usable can be prolonged.

EXAMPLE 7

Figure 9:
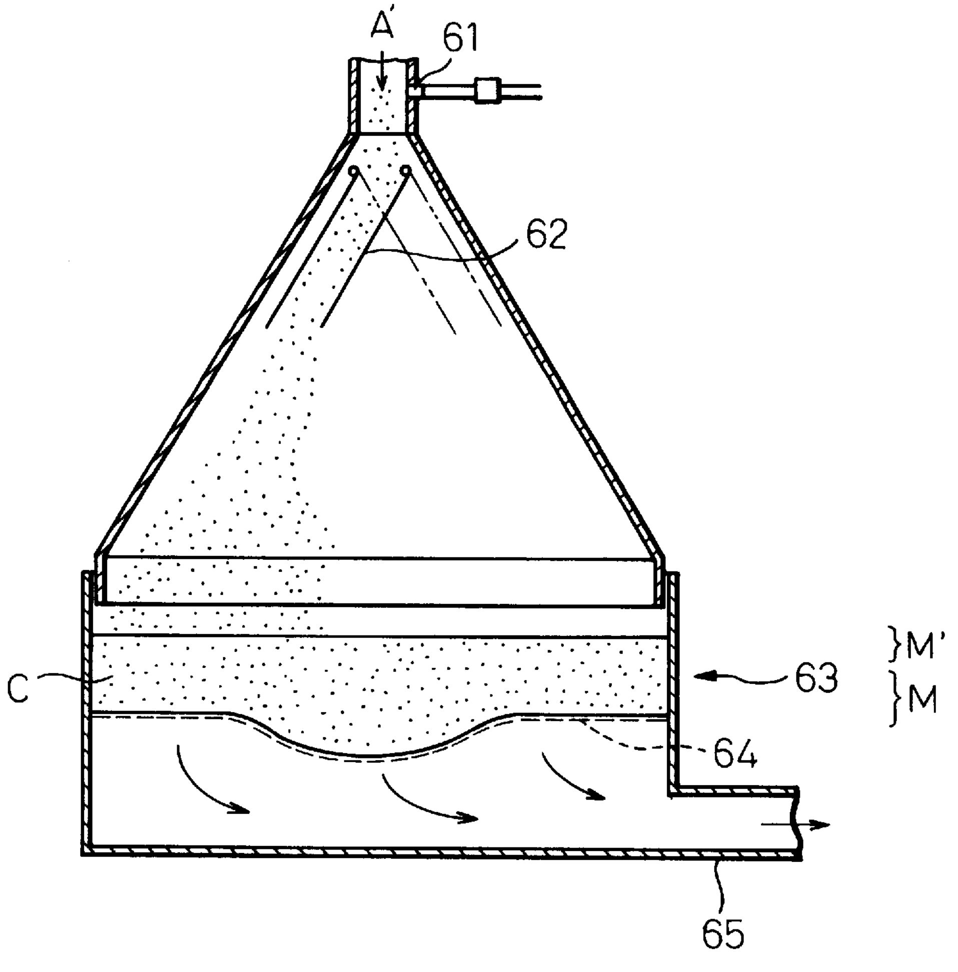
FIGS. 9 and 10 show different ways of adding a polyisocyanate to the fibrous mixture containing a phenol resin.
Figure 10:
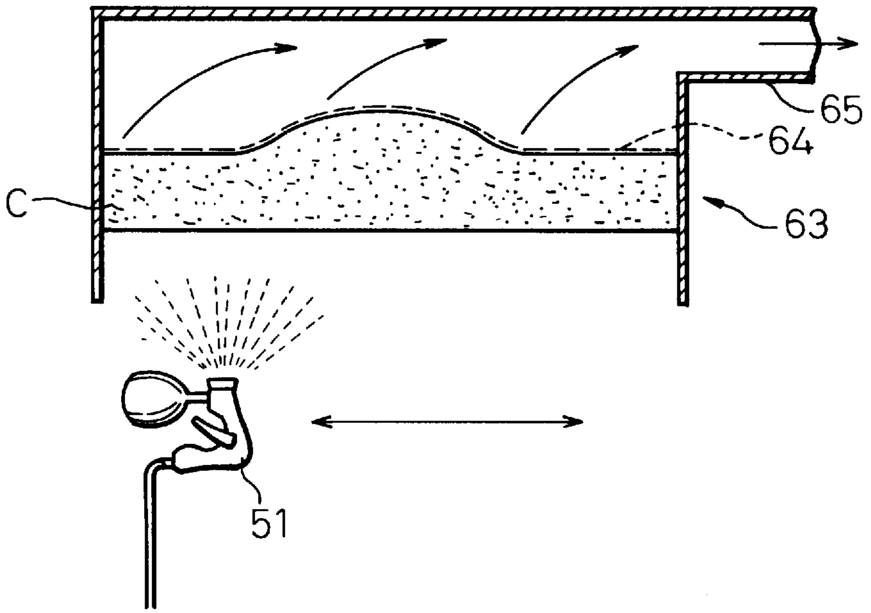

As shown in FIG. 9, using the same method as shown in Example 5, the fibrous mixture M' containing only the phenol resin was formed. This fibrous mixture M' was then allowed to fall from the nozzle 61 whereupon the polyisocyanate was sprayed thereto. The fibrous mixture M thus formed was supplied to the stacking case 63. In the inside of the stacking case 63 is provided a shape-forming member 64 composed of punched metal or the like, below which is provided a discharge tube 65 connected to a suction means. The fibrous mixture M is scattered from above the stacking case 63 by means of a scatterer 62, and is allowed to float and descend in the flow of the air suctioned through the discharge tube 65, whereby the fibrous mixture stacks onto the shape-forming member 64 to form the collected body W of the wooden material. The amount of the stacked collected body W of the wooden material is kept at about 80% of that required for the finished molded product. After thus stacking the fibrous mixture M, the spraying of the polyisocyanate is discontinued to stack the fibrous mixture M' which only contain the phenol resin but not the polyisocyanate. Thereafter, the surface of the stack is shaved and the extra amount of stack is discarded to obtain a given weight of the product. In this process, only the material which does not contain the polyisocyanate is discarded. Because the discarded material does not contain the polyisocyanate, no hardening proceeds in the material, so that it can be stored for a prolonged period of time and recycled as needed. After shaving is completed, as shown in FIG. 10, the stacking case 63 is reversed and the polyisocyanate is sprayed with air gun 51 from below. The collected body W of wooden material is then carried and the molded wooden product is formed using the same method as described in Example 1.

EXAMPLE 8

An anaerobic adhesive (Nihon Rokkutaito K.K., PMS-10E (trade mark)) at a concentration of 10% by weight was sprayed to the wooden fiber and this was stirred and mixed homogeneously by air. Though the adhesive can be used undiluted due to its low viscosity, it may be diluted with, for example, acetone to effect homogenous dispersion. The fibrous mixture thus prepared may be introduced into the stacking case in the same method as described in Example 1 to form the collected body W of wooden material, which then is carried to the molding device, wherein molding is performed at the mold temperature of 110° C., the compression time of 60 seconds, and the molding pressure of 30 kg/cm$^2$. At the start of the molding, the valve of the upper mold half was opened for suction for 60 seconds. The molded wooden products thus formed had a bending strength of 285 kgf/cm$^2$ and an adhesion strength of 2.1 kgf/cm$^2$ which were satisfactory.

EXAMPLE 9

To the wooden fiber having a water content of 6 to 9% by weight was admixed 10% by weight of an unsaturated polyester in powder form (Matsushita Denko K.K., CE5100 (trade mark)), and the mixture was stirred by hot air at about 80° C. to form a fibrous mixture M. The fibrous mixture M was introduced into the stacking case as described in Example 1 to form the collected body W of the wooden material. This was then carried to the molding device, wherein it was subjected to molding under the condition of the mold temperature of 130° C., the compression time of 40 seconds, and a molding pressure of 30 kg/cm$^2$. The molded wooden products thus formed had a bending strength of 290 kgf/cm$^2$ and an adhesion strength of 1.9 kgf/cm$^2$ which were satisfactory.

We claim:

1. A method of manufacturing a molded wooden product composed of a wooden body and a skin, comprising:

adding a binder to wood fibers to form a fibrous mixture;

stacking said fibrous mixture to form a collected body of wooden material;

delivering said collected body of wooden material to a compression mold wherein a skin material has been provided previously, said mold having a first mold half with which the skin material comes into contact and a second mold half with which the collected body of wooden material comes into contact; and compressing said collected body of wooden material and said skin material under heat to eliminate a large portion of air within the collected body and form said wooden body and to adhere said wooden body and said skin material simultaneously to form said molded wooden product, wherein said first mold half is heated to a first temperature less than a second temperature to which said second mold half is heated to minimize warp of said molded wooden product, and wherein said binder is selected from the group consisting of an anaerobic adhesive, an unsaturated polyester and a combination of a phenol resin and a polyisocyanate.

2. The method according to claim 1 in which said binder is a combination of a phenol resin and a polyisocyanate.

3. The method according to claim 2 in which a combination of a phenol resin and a polyisocyanate is added at a level of 6 to 20 wt % based on total weight of the fibrous mixture.

4. The method according to claim 2 in which the ratio of a phenol resin and a polyisocyanate is 1:3 to 3:1.

5. The method according to claim 4 in which the ratio of a phenol resin and a polyisocyanate is 1:1.

6. The method according to claim 2 in which the compressing of said collected body of wooden material and said skin material is carried out at a temperature of 90° to 130° C.

7. The method according to claim 2 in which the compressing of said collected body of wooden material and said skin material is carried out at the first temperature of from 80° to 110° C. and at the second temperature of from 100° to 150° C.

8. The method according to claim 2 in which a catalyst for hardening of said binder is applied onto a surface of said skin material which comes into contact with said collected body of wooden material.

9. The method according to claim 2 in which a catalyst for hardening of said binder is introduced into said collected body of wooden material at the time of compressing said collected body of wooden material and said skin material.

10. The method according to claim 2 wherein the phenol resin and the polyisocyanate are added separately and wherein the phenol resin is added to said wood fibers before the polyisocyanate is added.

11. The method according to claim 2 in which the phenol resin and the polyisocyanate are added separately wherein the phenol resin is added previously, and the polyisocyanate is added during the delivering of said collected body of wooden material to a compression mold just before inserting said collected body of wooden material into the mold.

12. The method according to claim 2 comprising adding the phenol resin to the wood fibers to form said fibrous mixture, adding a portion of the polyisocyanate into a first portion of said fibrous mixture to form a polyisocyanate mixture, stacking said polyisocyanate mixture to form a collected body of wooden material, placing a second portion of said fibrous mixture on top of the collected body of wooden material, removing an upper layer thereof in order to remove an amount of said collected body of wooden material in excess of an amount that is required for molding, spraying polyisocyanate onto said collected body of wooden material at a location from which said amount of said collected body of wooden material was removed, and delivering said collected body to the compression mold.

13. The method according to claim 10, wherein the polyisocyanate is added during the stacking of said fibrous mixture while forming the collected body of wooden material.

14. The method according to claim 1 wherein the first temperature is measurably less than the second temperature.

15. The method according to claim 1 wherein the first temperature is substantially less than the second temperature.

16. The method according to claim 1 wherein the first temperature is sufficiently lower than the second temperature to prevent substantial warping of the molded wooden product.

17. The method according to claim 1 wherein the first temperature is about 15° to about 50° C. lower than the second temperature.

* * * * *